(12) United States Patent
Cofer

(10) Patent No.: US 6,386,572 B1
(45) Date of Patent: May 14, 2002

(54) TRAILER HITCH APPARATUS AND METHODS OF USING SAME

(76) Inventor: Archie Cofer, P.O. Box 685, Nicoma Park, OK (US) 73066

( * ) Notice: Subject to any disclaimer, the term of this patent is extended or adjusted under 35 U.S.C. 154(b) by 0 days.

(21) Appl. No.: 09/918,196

(22) Filed: Jul. 30, 2001

Related U.S. Application Data

(60) Provisional application No. 60/290,192, filed on May 11, 2001.

(51) Int. Cl.[7] .................................................. B60D 1/40
(52) U.S. Cl. ........................................ 280/477; 33/264
(58) Field of Search ........................ 280/477, DIG. 14, 280/511; 33/264, 386; 116/28 R

(56) References Cited

U.S. PATENT DOCUMENTS

| | | |
|---|---|---|
| 4,552,376 A | 11/1985 | Cofer |
| 4,852,901 A | 8/1989 | Beasley et al. |
| 4,938,495 A | 7/1990 | Beasley et al. |
| 5,108,123 A | 4/1992 | Rubenzik |
| 5,191,328 A | 3/1993 | Nelson |
| 5,285,205 A | 2/1994 | White |
| 5,455,557 A | 10/1995 | Noll et al. |
| 5,513,870 A | 5/1996 | Hickman |
| 5,657,175 A | 8/1997 | Brewington |
| 5,729,194 A | 3/1998 | Spears et al. |
| 6,139,041 A * | 10/2000 | Murphy .................. 280/477 |
| 6,168,181 B1 * | 1/2001 | Gadd ...................... 280/477 |
| 6,209,902 B1 * | 4/2001 | Potts ....................... 280/477 |
| 6,273,448 B1 * | 8/2001 | Cross ...................... 280/477 |

* cited by examiner

*Primary Examiner*—Anne Marie Boehler
(74) *Attorney, Agent, or Firm*—Dunlap, Codding & Rogers, P.C.

(57) ABSTRACT

The present invention relates to a safe and secure trailer hitch for use with a towing vehicle. More particularly, but not by way of limitation, the present invention relates to an optical guiding trailer hitch device which allows an operator of a towing vehicle to easily, accurately, and safely attach a trailer to the towing vehicle. Additionally, the optical guiding trailer hitch device may further include an assembly for aligning the trailer in a horizontal plane relative to the towing vehicle. The present invention in conjunction with a trailer may be used for the transportation of a boat, a camper, a mobile home, or any such object which may be moved from one place to another place using a trailer and a towing vehicle.

4 Claims, 4 Drawing Sheets

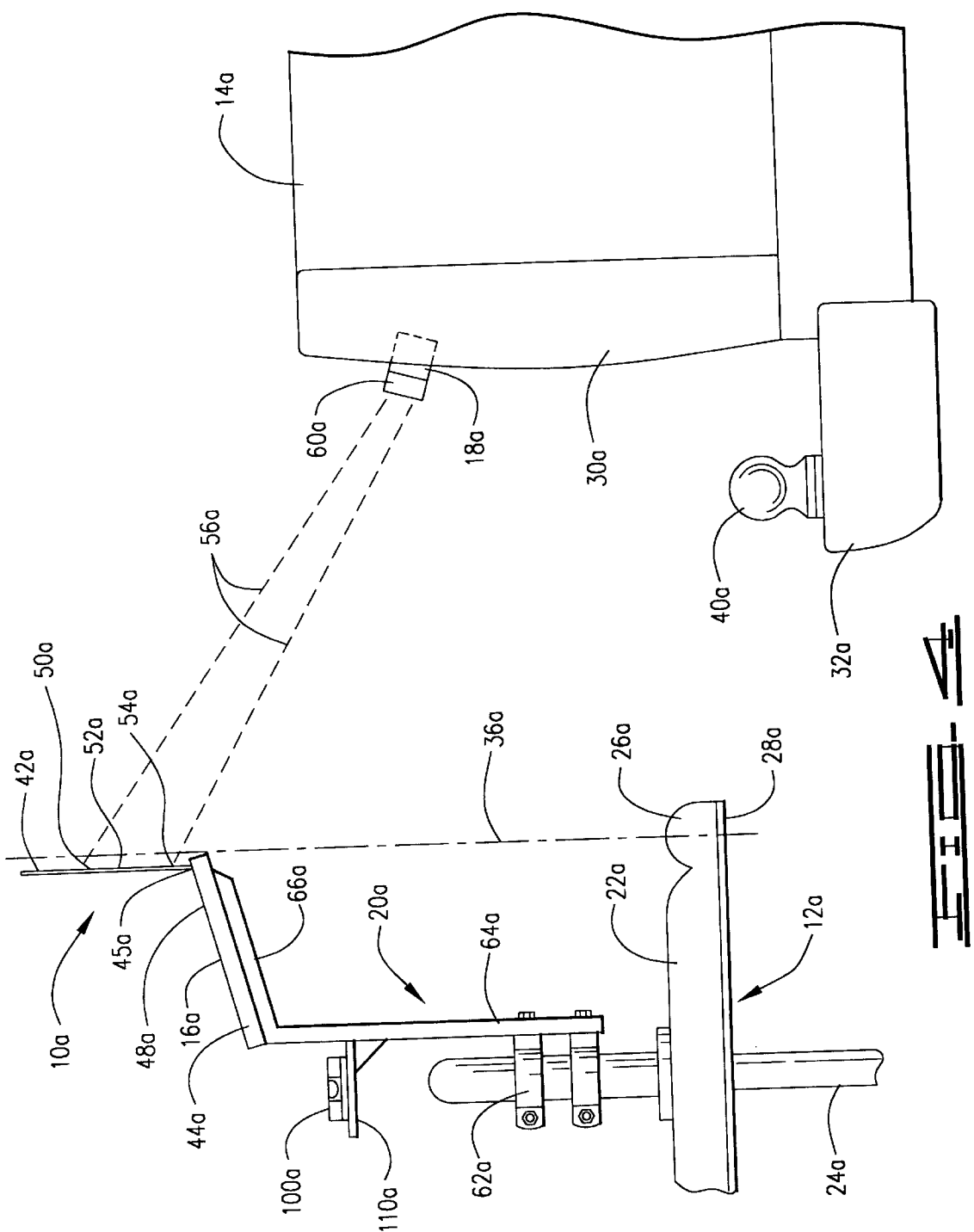

TRAILER HITCH APPARATUS AND METHODS OF USING SAME

CROSS-REFERENCE TO RELATED APPLICATIONS

This application relates to U.S. Provisional patent application, U.S. Ser. No. 60/290,192, filed May 11, 2001, entitled TRAILER HITCH APPARATUS AND METHODS OF USING SAME.

BACKGROUND OF THE INVENTION

1. Field of the Invention

The present invention relates to a safe and secure trailer hitch for use with a towing vehicle. More particularly, but not by way of limitation, the present invention relates to an optical guiding trailer hitch device which allows an operator of a towing vehicle to easily, accurately, and safely attach a trailer to the towing vehicle. The optical guiding trailer hitch device includes a target assembly, a signal assembly and a support assembly which keeps the signal assembly and the target assembly in a predetermined spaced apart configuration. In operation, the signal assembly emits at least one converging light ray onto the target assembly. When the at least one converging light ray is position in a predetermined spot on the target assembly, the operator can be assured that the towing vehicle and the trailer are in proper alignment for coupling and eventual towing. Additionally, the optical guiding trailer hitch device may further include an assembly for aligning the trailer in a horizontal plane relative to the towing vehicle. The present invention in conjunction with a trailer may be used for the transportation of a boat, a camper, a mobile home, or any such object which may be moved from one place to another place using a trailer and a towing vehicle.

2. Description of the Related Art

Traditionally, a user who wanted to attach a trailer onto a towing vehicle was required to conduct a difficult, unsafe and time consuming ballet of mechanical procedures and actions. Even with the assistance of a helper giving verbal directions to the operator of the towing vehicle, the process is an aggravated ritual of trial and error. The operator's and/or helper's inability to accurately gauge the depth and alignment of the trailer in relation to the towing vehicle is the most common cause of problems. When a helper is not available to provide assistance, the inability to successfully couple the trailer to the towing vehicle increases exponentially, thereby resulting in an undue amount of back and forth movement of the towing vehicle. The operator must also leave the driver position and possibly even the towing vehicle itself numerous times in order to observe the relative positions of the trailer and the towing vehicle. For an individual with physical limitations and/or increasing age, such movements may be difficult if not impossible to perform.

The task is further complicated by the myriad styles and types of trailers available in the market as well as the differing types of hitch devices used to couple to the trailer. Oftentimes these hitch devices are not standardized and an individual owning several types of trailers would have to learn several unique and distinct "coupling ballets" for each trailer.

Numerous alignment devices are known in the art which attempt to assist the operator in aligning the trailer with the towing vehicle using many complicated and unwieldy hitch devices. One such hitch device contemplates the use of two or more members which are supported by either the towing vehicle and/or the trailer itself. The two or more members must be maintained in an exacting spatial alignment while the operator simultaneously places the towing vehicle in reverse and cautiously approaches the trailer. Such typically known hitch devices depend on the ability of the operator to maintain a fixed visual reference during the entire reverse approach maneuver. Such sequences of events are unrealistic and oftentimes dangerous in practice. In fact, any movement of the operator's head toward either side will almost certainly interrupt the fixed visual reference and thereby result in an inaccurate alignment of the hitch device on the towing vehicle and the trailer.

One such known patent is U.S. Pat. No. 3,720,000 which shows a guide ball mounted in a vertical spaced relation above a trailer hitch ball and a lamp positioned vertically above a trailer hitch socket such that when the guide ball contacts the lamp support, a switch is closed thereby illuminating a lamp indicating to the operator that the trailer hitch ball is disposed under the hitch socket. This device requires the operator to align the guide ball with a target area on the lamp support while backing the towing vehicle. This maneuvering results in a lateral misalignment of the hitch components and increased frustration on the part of the operator. Such misalignment is especially likely to occur because of the difficulty the operator has in maintaining visual reference with either the towing vehicle or the trailer.

Thus, the present invention solves the problems of repeated attempts at attaching a towing vehicle hitch device to a trailer and/or trailer hitch assembly.

SUMMARY OF THE INVENTION

The present invention is a trailer hitch coupling guide. The trailer hitch coupling guide includes (1) a target assembly having an upright translucent panel; (2) a signal assembly having a means for emitting at least one converging light rays; and (3) a support assembly for holding the signal assembly in an optically engaged position with the target assembly, the support assembly further including a horizontal alignment assembly. The signal assembly is further operably associated with a trailer tongue on a trailer and the target assembly is operably associated with a rearward portion of a towing vehicle having a trailer hitch assembly thereon.

In an alternate embodiment, the present invention is a trailer hitch coupling guide. The trailer hitch coupling guide includes (1) a target assembly having an upright opaque panel; (2) a signal assembly having a means for emitting at least one converging light rays; and (3) a support assembly for holding the signal assembly in an optically engaged position with the target assembly, the support assembly further including a horizontal alignment assembly. The target assembly is further operably associated with a trailer tongue on a trailer and the signal assembly is operably associated with a rearward portion of a towing vehicle having a trailer hitch assembly thereon.

The present invention also includes methods of using the different embodiments of the trailer hitch coupling guide disclosed herein.

BRIEF DESCRIPTION OF THE SEVERAL VIEWS OF THE DRAWINGS

FIG. 4 is a side plan view of an alternative embodiment of the present invention.

DETAILED DESCRIPTION OF THE INVENTION

Figure 1:
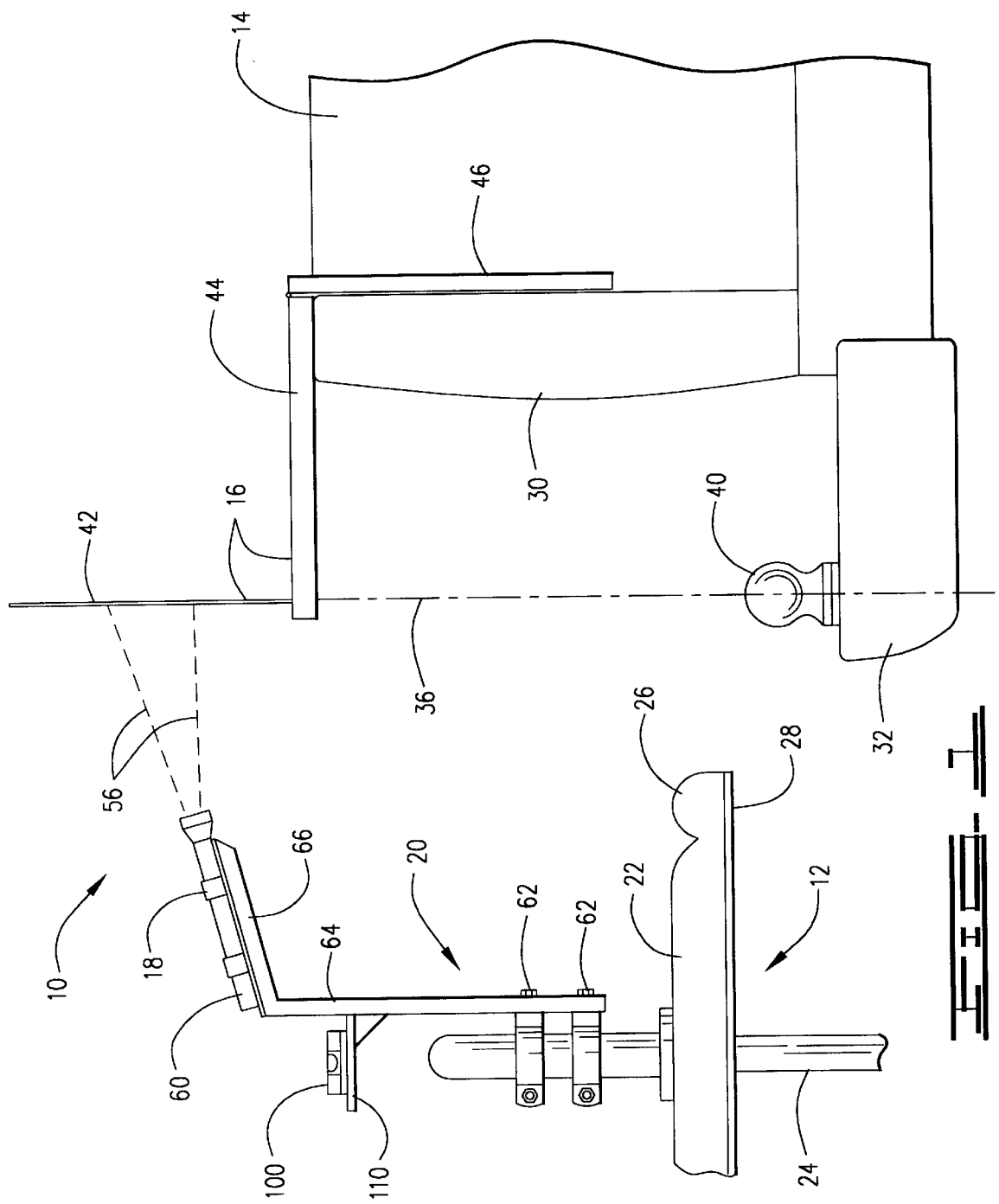
FIG. 1 is a side plan view of the present invention.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

Referring now to the drawings, and more particularly to FIG. 1, shown therein is a trailer hitch coupling guide, generally designated by reference numeral 10, for attaching a trailer 12 to a towing vehicle 14. The trailer hitch coupling guide 10 includes a target assembly 16, a signal assembly 18, and a support assembly 20. The trailer 12 has a trailer tongue 22 that provides support for the signal assembly 18. The trailer 12 also has a trailer jack 24 that is vertically movable in order to raise and lower support the trailer tongue 22 to a selected elevation above a ground position (not shown). A forward end 26 of the trailer tongue 22 is provided with a socket portion 28. The towing vehicle 14 has a tailgate 30 and a bumper 32. The bumper 32 supports a trailer hitch assembly 40 for connection with the socket portion 28 of the trailer tongue 22. The target assembly 16 is mounted on the tailgate 30 and is positioned generally so that a portion of the target assembly 16 is aligned with and intersects a vertical plane 36 extending longitudinally through the trailer hitch assembly 40.

Figure 2:
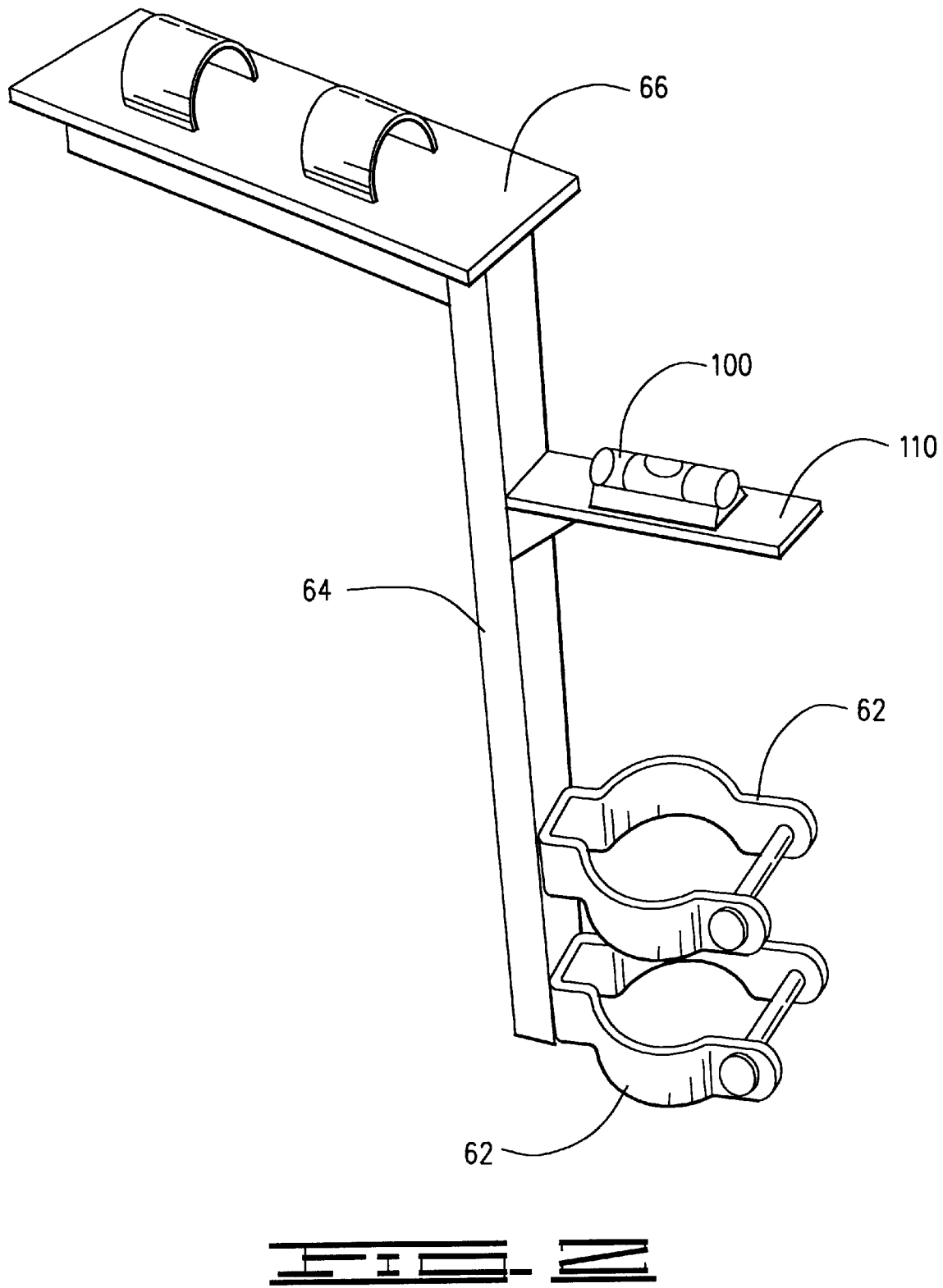
FIG. 2 is a perspective side view of the present invention.
Figure 3:
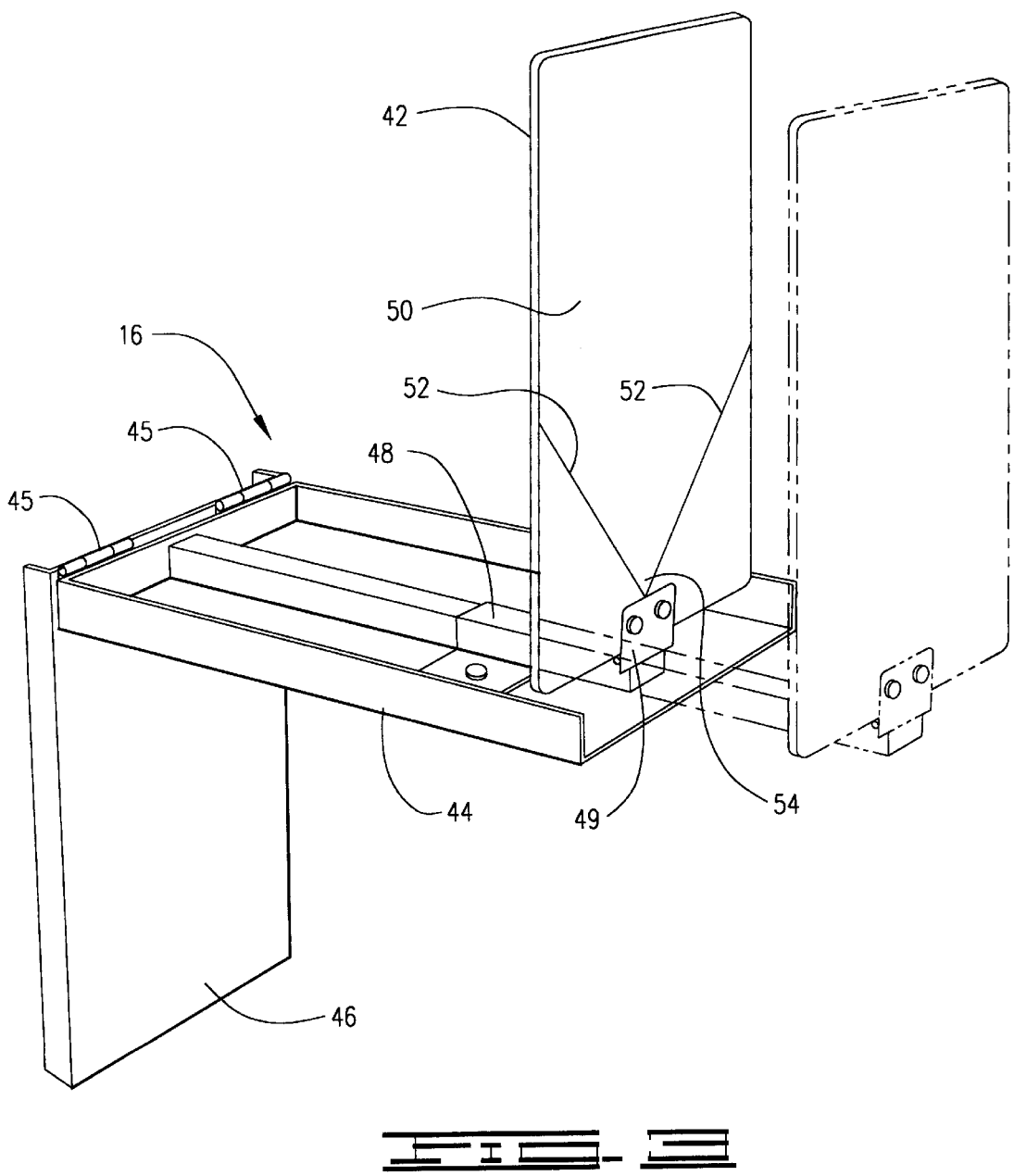
FIG. 3 is an perspective top view of the present invention.

As shown in FIGS. 1 and 3, the target assembly 16 has an upright panel 42, a base member 44, a lid 46 for closing the base member 44, and a slidably movable horizontal member 48. The upright panel 42 can be connected to the slidably movable horizontal member 48 with screws and bolts (i.e. bolt assembly 49), however, it should be understood that any suitable means may be used in connecting the upright panel 42 with the slidably movable horizontal member 48. In the embodiment shown in FIGS. 1 and 2, the upright panel 42 is made of a translucent material such as floster plexiglass. The slidably movable horizontal member 48 adjusts the upright panel 42 in a lateral direction generally toward and/or away from the lid 46. Two positions of upright panel 42 are shown in FIG. 3—the solid line version of upright panel 42 depicts upright panel 42 in a position close to lid 46, while the broken line version of upright panel 42 depicts the upright panel 42 in a position extended and away from lid 46. As can be appreciated from FIG. 3, upright panel 42 can be adjusted along a horizontal plane such that upright panel 42 is located a varying distance away from or close to lid 46. The amount of adjustment of the upright panel 42 by the slidably movable horizontal member 48 depends on the distance the trailer hitch assembly 40 extends from the bumper 32 of the towing vehicle 14—i.e. the distance must be such that the upright panel 42 aligns with and intersects the vertical plane 36.

The upright panel 42 further includes a targeting portion 50. The targeting portion 50 has at least two converging guide lines 52 such that the area directly above the point that the at least two converging guide lines 52 actually converge defines an alignment portion 54. When the alignment portion 54 is illuminated by at least one converging light ray 56 (FIG. 1) from the signal assembly 18, a vertically superimposed position of the trailer tongue 22 in an aligned relation to the trailer hitch assembly 40 is represented. In the embodiment shown in FIGS. 1 and 3, the lid 46 of the target assembly 16 is operably associated with the tailgate 30 of the towing vehicle 14. When not in operation, the upright panel 42 folds and stores into the base member 44, the base member 44 folds along a folding assembly 45 and stores into the lid 46 of the target assembly 16.

As best shown in FIGS. 1 and 2, the signal assembly 18 has a light emitting means 60 which emits the at least one converging light ray 56. The emitting means 60 is mounted on the support assembly 20. The support assembly 20 has a bracket portion 62 that is adjustably connected to the trailer jack 24 of the trailer tongue 22. The bracket portion 62 includes a support platform 66 which projects upwardly and is forwardly inclined and supports the emitting means 60. The emitting means 60 may include a conventional battery powered lamp or a laser. It will be appreciated that the size of the emitting means 60 and the construction of the emitting means 60 can be varied. Assemblies which emit light rays are well known in the art, and no further description of their components, construction, or operation is believed necessary in order for one skilled in the art to understand and implement the emitting means 60 of the trailer hitch coupling guide 10 of the present invention.

The support assembly 20 also includes a horizontal alignment assembly 100 which is mounted on a support means 110. The horizontal alignment 110 is adjustable by an operator to mark the horizontal position of the trailer tongue 22 in relation to the trailer hitch assembly 40. It is contemplated that horizontal alignment assembly 100 be a convex bubble level, although any device which may be adjusted to mark horizontal positions is by intended to be included for use.

The light emitting means 60 directs the at least one converging light ray 56 in an upwardly and forwardly inclined direction toward the upright panel 44 of the target assembly 16 (as shown in FIG. 1). The at least one converging light ray 56 engages and illuminates the alignment portion 54 of the target assembly 16. Thereby providing a visual representation that the forward end 26 of the trailer tongue 22 is vertically aligned with the trailer hitch assembly 40 of the towing vehicle 14.

Referring now to FIG. 4, an additional embodiment of the trailer hitch coupling guide 10a is shown. The trailer hitch coupling guide 10a is similar to the trailer hitch coupling guide 10 as shown in FIGS. 1–3 with the differences being hereafter noted. The trailer hitch coupling guide 10a is used for hitching a trailer 12a to a towing vehicle 14a. The trailer hitch coupling guide 10a includes a target assembly 16a, a signal assembly 18a, and a support assembly 20a. The trailer 12a has a trailer tongue 22a that provides support for the support assembly 20a. The trailer tongue 22a is connected to the trailer 12a. The trailer 12a also includes a trailer jack 24a that is movable along a vertical plane to thereby support the trailer tongue 22a at a pre-determined elevation. The forward end 26a of the trailer tongue 22a is provided with a socket portion 28a. The towing vehicle 14a has a tailgate 30a and a bumper 32a. The bumper 32a supports a trailer hitch assembly 40a for connection with the socket portion 28a of the trailer tongue 22a. The signal assembly 18a is mounted on the tailgate 30a (not shown) and intersects a vertical plane 36a extending longitudinally through the trailer hitch assembly 40a or within the tailgate 30a (shown).

The target assembly 16a, is similar to the target assembly 16, as shown in FIG. 3, has an upright panel 42a, a base member 44a, a folding assembly 45a, and a slidably movable horizontal member 48a. The upright panel 42a is opaque in this embodiment and has a targeting portion 50a. The targeting portion 50a has at least two downwardly converging guide lines 52a that forms an alignment portion 54a. The target assembly 16a is longitudinally aligned with the forward end 26a and the socket portion 28a of the trailer tongue 22a.

The target assembly 16a is mounted on the support assembly 20a. The support assembly 20a is operably associated with the trailer tongue 22a on the trailer 12a. The support assembly 20a has a bracket portion 62a that extends upwardly and is adjustably aligned with a longitudinal axis 64a of the trailer tongue 22a. The bracket portion 62a includes a platform 66a which is forwardly inclined and which underlies the target assembly 16a. The support assembly 20a holds the target assembly 16a in an optically engaged position a with the signal assembly 18a.

The signal assembly 18a is operably associated with a rearward portion of the towing vehicle 14a. The signal assembly 18a has a light emitting means 60a for emitting at least one converging light ray 56a. The light emitting means 60a is mounted on the tailgate 30a. The light emitting means 60a directs at least one converging light ray 56a in an upwardly and forwardly inclined direction in a vertical plane 36a aligned with a controlled longitudinal axis of the trailer tongue 22a. The at least one converging light ray 56a engages and illuminates an alignment portion 54a of the target assembly 16a in accordance with an aligned position of the trailer tongue 22a with the trailer hitch assembly 40a.

OPERATION

Assuming that socket portion 28 is connected with the trailer hitch assembly 40 and the trailer 12 has been positioned in a desired location, the trailer jack 24 is raised to support the trailer tongue 22 and lift the socket portion 28 off of the trailer hitch assembly 40. The horizontal alignment assembly 100 is adjusted to indicate a horizontally aligned position relative to the trailer hitch assembly 40. With the towing vehicle 14 and trailer 12 in this position the upright panel 42 (translucent in embodiments shown in FIGS. 1–3; opaque in the embodiment shown in FIG. 9) is unfolded and the light emitting means 60 is placed on the support platform 66 of the bracket portion 62 and is adjusted vertically on the trailer jack 24 so that with the light emitting means 60 turned on the at least one converging light ray 56 focus is on and illuminates the alignment portion 54 for the purpose presently explained.

The towing vehicle 14 is then moved out of the way and the trailer tongue 22 is adjusted by the trailer jack 24 in order to level the trailer 12 for storage. The light emitting means 60 is then normally removed from the support platform 66 for safe keeping or other uses.

When it is desired to connect the trailer 12 with the towing vehicle 14 the trailer jack 24 is again raised and positioned such that the horizontal alignment assembly 100 is disposed in its marked position relative to the trailer hitch assembly 40 and the emitting means 60 is positioned on its support platform 66 and its switch is moved to the on position. The upright panel 42 is positioned to project vertically above the limit of the tailgate 30 and is held in this position by tightening the bolt assembly 49, however it should be understood that any suitable means can be used to hold the upright panel 42 in its extended vertical position.

To operate the trailer hitch coupling guide 10, the driver moves the towing vehicle 14 in a conventional reverse manner toward the forward end 26 of the trailer 12. The driver backs the towing vehicle 14 toward the forward end 26 of the trailer 12 while visually inspecting and aligning the upright panel 42 with the front end 26 of the trailer 12. When the at least one converging light ray 56 contacts the upright panel 42 and as the towing vehicle 14 moves toward the trailer 12, the at least one converging light ray 56 forms an illuminated spot near the alignment portion 54 of the upright panel 42. The driver visually observes the position of the at least one converging light ray 56 and determines whether or not the towing vehicle 14 is aligned with or laterally out-of-line with the socket portion 28 and corrects the position of the towing vehicle 14 accordingly.

Consequently, when the at least one light ray 56 is focused on the alignment portion 54, the driver is confident that the socket portion 28 is positioned over the trailer hitch assembly 40 so that the driver may leave the towing vehicle 14 and connect the trailer 12 and the towing vehicle 14.

To operate the alternative embodiment as shown in FIG. 4, the target assembly 16a of the trailer hitch coupling guide 10a is positioned and mounted on the support assembly 20a and the support assembly 20a is operably connected to the trailer 12a. The support assembly 20a is operably connected to the trailer 12a by the use of bracket and screws, however it should be understood that any suitable means can be used to connect the support assembly 20a to the trailer 12a. The signal assembly 18a is mounted on the tailgate 30a of the towing vehicle 14a. Alternatively, the signal assembly 18a may be permanently installed in the tailgate 30a of the towing vehicle 14a.

The driver moves the towing vehicle 14a in a conventional reverse manner toward the forward end 26a of the trailer 12a. The driver backs the towing vehicle 14a toward the forward end 26a of the trailer 12a by visually aligning the light emitting means 60a with the front end 26a of the trailer 12a. When the at least one converging light ray 56a contacts the upright panel 42a and as the towing vehicle 14a moves toward the trailer 12a, the at least one light ray 56a forms an illuminated spot near the alignment portion 54a of the upright panel 42a. The driver visually observes the position of the at least one converging light ray 56a and determines whether or not the towing vehicle 14a is aligned with or laterally out-of-line with the socket portion 28a and corrects the position of the towing vehicle 14a accordingly.

When the at least one converging light ray 56a is focused on the alignment portion 54a, the driver is confident that the socket portion 28a is positioned over the trailer hitch assembly 40a so that the driver may leave the towing vehicle 14a and connect the trailer 12a and the towing vehicle 14a.

From the above description it is clear that the present invention is well adapted to carry out the objects and to attain the advantages mentioned herein as well as those inherent in the invention. While presently preferred its embodiments of the invention have been described for purposes of this disclosure, it will be understood that numerous changes may be made which will readily suggest themselves to those skilled in the art and which are accomplished within the spirit in the art which are accomplished within the spirit of the invention disclosed and as defined in the following claims.

What is claimed is:

1. A trailer hitch coupling guide comprising:
   a target assembly having an upright translucent panel, the translucent panel having a base member, a lid for closing the base member, a straight horizontal upper end surface forming a guide portion, and a slidably movable horizontal member for adjusting the translucent panel in a lateral horizontal direction, wherein the target assembly is longitudinally aligned with a central longitudinal axis of a rearward portion of a towing vehicle;

a signal assembly having a means for emitting at least one converging light rays;

a support assembly for holding the signal assembly in an optically engaged position with the target assembly, the support assembly further including a horizontal alignment assembly, and wherein the signal assembly is further operably associated with a trailer tongue on a trailer and the target assembly is operably associated with a rearward portion of a towing vehicle having a trailer hitch assembly thereon; and a targeting portion operatively associated with the translucent panel having at least two downwardly converging guide lines thereby forming an alignment portion, wherein when the alignment portion is illuminated by the at least one converging light rays emitted from the signal assembly, a vertically superimposed representation of the trailer tongue in a vertical relation to the trailer hitch assembly is visible through the translucent upright panel.

2. The trailer hitch coupling guide according to claim 1, wherein the support assembly further includes an upwardly extending bracket portion which is slidably vertically adjustably connected to the trailer tongue, the bracket portion further including an inclined platform which supports the emitting means.

3. A trailer hitch coupling guide comprising:

a target assembly having an upright opaque panel, the opaque panel having a base member, a lid for closing the base member, a straight horizontal upper end surface forming a guide portion, and a slidably movable horizontal member for adjusting the opaque panel in a lateral horizontal direction;

a signal assembly having a means for emitting at least one converging light rays, wherein the signal assembly is longitudinally aligned with a central longitudinal axis of a rearward portion of a towing vehicle;

a support assembly for holding the signal assembly in an optically engaged position with the target assembly, the support assembly further including a horizontal alignment assembly, and wherein the target assembly is further operably associated with a trailer tongue on a trailer and the signal assembly is operably associated with a rearward portion of a towing vehicle having a trailer hitch assembly thereon; and a targeting portion operatively associated with the opaque panel having at least two downwardly converging guide lines thereby forming an alignment portion, wherein when the alignment portion is illuminated by the at least one converging light rays emitted from the signal assembly, a vertically superimposed representation of the trailer tongue in a vertical relation to the trailer hitch assembly is visible on the opaque upright panel.

4. The trailer hitch coupling guide according to claim 3, wherein the support assembly further includes an upwardly extending bracket portion which is slidably vertically adjustably connected to the trailer tongue, the bracket portion further including an inclined platform which supports the emitting means.

* * * * *